United States Patent Office 2,722,794
Patented Nov. 8, 1955

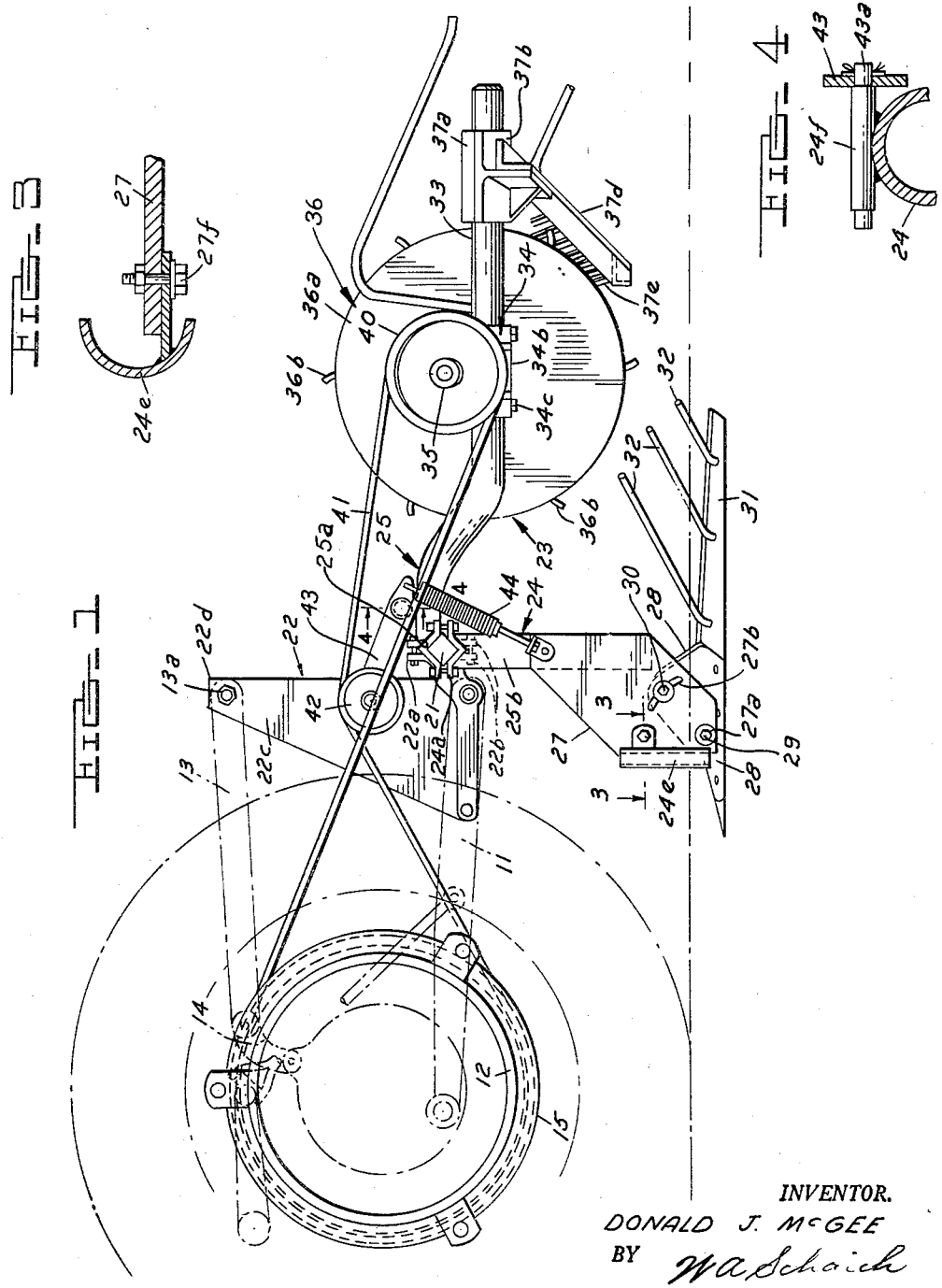

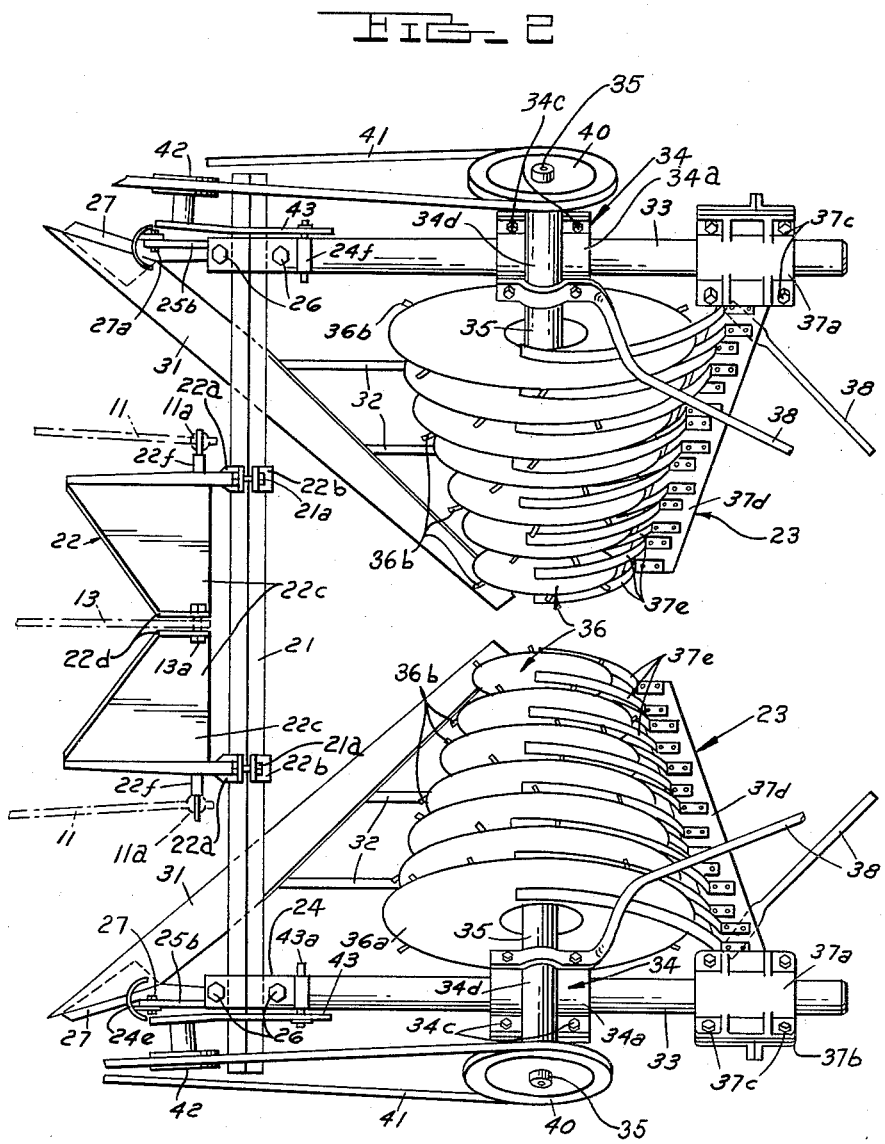

2,722,794

ADJUSTABLY MOUNTED PEANUT DIGGER FRAME

Donald J. McGee, Birmingham, Mich., assignor, by mesne assignments, to Ford Motor Company, Dearborn, Mich., a corporation of Delaware Application November 4, 1952, Serial No. 318,566

1 Claim. (Cl. 55—139)

This invention relates to an improved frame for a combination harvesting implement for effecting the concurrent digging, vine lifting and shaking, and windrowing of a root crop such as peanuts.

There is disclosed in the art a peanut digging and lifting device of the type employing a conically shaped rotating drum transversely disposed with respect to the row of peanut vines, which functions as a vine lifting, shaking and windrowing device. It is, of course, desirable that devices of this type be capable of operating on at least two rows of the root crop at one time. The frame construction of the combination digging and shaking device disclosed in the art, however, could only accommodate a limited range of row widths of the root crop. It happens that throughout the peanut growing area a very wide range of row widths are employed, for example ranging from 24" to 42", and it is obviously desirable from a manufacturing economy standpoint to provide a single design of such machine which can accommodate all of the various row spacings. Additionally, there are substantial differences in the varieties of peanuts grown in the United States and in the characteristics of the vines and the soils in the different regions where they are grown. Therefore, it is also necessary to incorporate a substantial amount of adjustment of the position of the lifting and shaking drum with respect to the digging blade in order to achieve optimum performance under all crop conditions.

Accordingly, it is an object of this invention to provide an improved frame construction for a root crop harvesting device such as a peanut digger and shaker, characterized by the provision of an unusual range of adjustments to accommodate row width and crop condition variations.

A particular object of this invention is to provide a simple, economically manufacturable frame of the tool bar type for a combination peanut digging and shaking implement which is particularly adaptable for mounting upon the power-lifted hitch links of a well-known form of tractors.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a peanut digging and shaking device incorporating this invention, shown in mounted relationship to a tractor;

Figure 2 is a plan view of the device of Figure 1;

Figure 3 is an enlarged scale, partial sectional view taken on the plane 3—3 of Figure 1; and Figure 4 is an enlarged scale, partial sectional view taken on the plane 4—4 of Figure 1.

As shown on the drawings:

The numeral 10 illustrates a well-known form of farm tractor having a pair of laterally spaced, power-lifted hitch links 11 trailingly pivoted to spaced points on the tractor rear axle housing 12. Additionally, a top link 13 is provided which is pivotally connected in conventional fashion to a rocker element 14 centrally mounted on the top portions of the tractor rear axle housing. For driving the rotating elements of the implement embodied in this invention, a sheave 15 is bolted in surrounding relationship to each brake drum of the tractor for rotation therewith. The foregoing elements are all of conventional construction and hence require no further detailed description.

In accordance with this invention, a peanut-digging and shaking device 20 is entirely supported by a transversely disposed tool bar 21. At the central portions of tool bar 21, an A-frame construction 22 is mounted which includes two laterally spaced clamping brackets 22a and cooperating caps 22b, which are clamped to tool bar 21 by bolts 21a. A pair of upstanding plates 22c are respectively suitably secured at their bottom ends to brackets 22a and slope inwardly and upwardly to terminate in parallel portions 22d between which the trailing end of the top link 13 is mounted by a suitable pin 13a. A pair of hitch pins 22f are respectively mounted on the brackets 22a in laterally projecting relationship and such pins are respectively received in the bearing sleeves 11a conventionally provided in the ends of hitch links 11. Hence, tool bar 21 is effectively connected to the tractor 10 and can be raised or lowered by the power-lifted movements of hitch links 11.

The peanut digging and shaking implement 20 illustrated in the drawings is preferably of the two row type and as such, provides a pair of identical harvesting units 23 which are mounted in laterally spaced relationship on tool bar 21 but are, of course, disposed in mirror image reversed relationship relative to each other.

Each digging and shaking unit 23 embodies upper and lower brackets 24 and 25 respectively, which have end portions 24a and 25a shaped to partially surround the tool bar 21 and hence permit such brackets to be rigidly clamped to such tool bar at any selected lateral location therealong by tightening of clamping bolts 26. The lower bracket 25 has a depending beam portion 25b suitably secured thereto and beam portion 25b mounts a blade support plate 27. Supporting plate 27 is provided with an aperture 27a in its lower forward extremity and an arcuate slot 27b which defines an arc swung about aperture 27a as a center. A frog 28 is mounted to plate 27 by a pair of bolts 29 and 30 which respectively cooperate with aperture 27a and slot 27b. Hence, the angular position of frog 28 relative to plate 27 thus can be adjusted in a vertical plane within the limits permitted by arcuate slot 27b. A digging blade 31 of conventional configuration is bolted to the frog 28 and is thereby disposed in an angular transverse relationship with respect to the direction of travel of the tractor. To reduce the tendency of the vines to adhere to the support plate 27, a semi-cylindrical shield 24e may be rigidly mounted forwardly of the front edge of the support plate 27, as by suitable bolts 27f.

The clamping upper and lower brackets 24 and 25 are normally positioned on tool bar 21 so as to dispose the center of the digging blade 31 in alignment with the row being operated on. A plurality of upwardly and rearwardly projecting, lifting tines 32 are secured in spaced relationship along digging blade 31 and function to elevate the vines being dug for engagement by the vine lifting and shaking drum as will be described.

The upper bracket 24 has suitably secured thereto a rearwardly projecting tubular arm 33. A journal 34 is provided comprising a body portion 34a which is shaped to surround half of tubular arm 33 and a cap portion 34b which is shaped to surround the remaining half of tubular arm 33 and to be drawn into clamping relationship with tubular arm 33 by virtue of tightening of a plurality of bolts 34c. Thus, each journal 34 may be located at any desired longitudinal position along tubular arm 33. Journal body portion 34a additionally provides a shaft bearing portion 34d which defines a vertically inclined transverse bearing axis for a shaft 35. A combination lifting and shaking drum 36 is mounted upon that portion of shaft 35 which overlies the vines of the root crop. Briefly, drum 36 is of conical configuration, being formed of a plurality of axially spaced discs 36a which are of progressively decreasing diameter with the largest diameter disc being disposed adjacent the supporting arm 33. Each disc 36a has a plurality of generally radially disposed pick-up fingers 36b secured in spaced relationship around its periphery and such fingers function to pick up the vines elevated by the lifting tines 32 and move the vines over the top of the drums 36 and to deposit the same in a windrow, the windrowing action being largely produced by the conical configuration of the drum 36 as described in the aforementioned copending application.

Additionally, in order to insure that the vines will not adhere to the lifting and shaking drum 36, a vine stripping device 37 is provided comprising clamping portions 37a and 37b, which are mounted in clamping relationship to the support arm 33 by bolts 37c, and a bar 37d which is secured to clamping portion 37b and projects inwardly in parallel relationship to the periphery of drum 36. A plurality of curved flexible stripping fingers 37e are mounted along bar 37d and respectively project into the spaces intermediate the discs 36a of the drum 36.

If desired, a plurality of rearwardly and inwardly projecting crowding rods 38 may be mounted on the device at any suitable point and function to assist in crowding of the vines discharged from the drums 36 into a compact windrow.

The drum shaft 35, and hence the drum 36, is driven by a pulley 40 which is mounted on the lateral outer end of shaft 35. A belt 41 is then trained over pulley 40 and the bracket drum pulley 15 provided on the tractor. Belt 41 is reversed intermediate its ends so that the drum 36 is driven in contra-rotating relationship to the travel of the tractor. A belt tightening idler pullley 42 is provided, being mounted on the end of support arm 43 which is pivotally mounted by a pin 43a in a bearing sleeve 24f which is welded to the forward extremity of tubular arm 33. A suitable spring 44 is provided to operate between the idler pulley support arm 43 and the depending beam 25b. In this manner, proper tension is maintained in belt 41 irrespective of the selected longitudinal position of the drum 36.

When the digging blades 31, the drums 36 and the stripping device 37 are adjusted to proper relationship with respect to the width of the rows being operated on and relative to each other, the roots of the crop are loosened by the digging blades 31 and the vines and roots are elevated by the lifting tines 32 where they are contacted by drums 36 and forcibly thrown over the top of the drums and deposited in a windrow. In the course of their travel over the drums 36, any soil clinging to the vines or roots is dislodged and dropped from the vines and roots.

It is, therefore, clearly apparent that this invention provides a frame construction for a peanut digger possessing the advantages of outstanding economy of manufacture and yet providing adjustment to cope with any and all row and crop conditions encountered, so as to insure optimum performance under any conditions.

It will, of course, be understood that various details of construction may be varied through a wide range without departing from the principles of this invention and it is, therefore, not the purpose to limit the patent granted hereon otherwise than necessitated by the scope of the appended claim.

I claim:

A peanut digger device comprising a tool bar, means of attaching said tool bar to a tractor in transverse relation, a lower bracket shaped to partially surround said tool bar, an upper bracket cooperating with said lower bracket in clamping relation to surround said tool bar, means for clamping said brackets to said tool bar at any selected lateral position, a depending beam secured to said lower bracket, a vine digging tool mounted on the end of said depending beam and having a plurality of laterally spaced, upwardly, rearwardly projecting tines secured to said tool to elevate the loosened vines, a rearwardly projecting longitudinal arm secured to said upper bracket, a rotatable vine shaking device, means for journaling said vine shaking device at a longitudinal position on said arm selected to permit the vine shaking device to pick up elevated vines as such vines move off said tines, the cooperative clamping of said upper and lower brackets to said tool bar at any selected lateral position vertically positioning said vine shaking and vine digging devices with respect to each other.

References Cited in the file of this patent

UNITED STATES PATENTS

| | | |
|---|---|---|
| 1,603,019 | Boda | Oct. 12, 1926 |
| 2,540,094 | Brown et al. | Feb. 6, 1951 |
| 2,632,372 | Williams | Mar. 24, 1953 |
| 2,669,820 | Falkner | Feb. 23, 1954 |